(12) United States Patent
Bashir et al.

(10) Patent No.: US 9,715,888 B1
(45) Date of Patent: Jul. 25, 2017

(54) DATA WRITER WITH SHAPED WRITE COIL

(71) Applicant: Seagate Technology LLC, Cupertino, CA (US)

(72) Inventors: Muhammad Asif Bashir, Londonderry (GB); Kirill A. Rivkin, Edina, MN (US); JianHua Xue, Maple Grove, MN (US); Beverley R. McConnell, Londonderry (GB); Wei Tian, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/130,357

(22) Filed: Apr. 15, 2016

(51) Int. Cl.
*G11B 5/31* (2006.01)
*G11B 5/17* (2006.01)

(52) U.S. Cl.
CPC .............. *G11B 5/3116* (2013.01); *G11B 5/17* (2013.01)

(58) Field of Classification Search
CPC ......... G11B 5/31; G11B 5/127; G11B 5/3116; G11B 5/1278
USPC ............ 360/123.01–123.07, 125.12, 125.24, 360/125.31, 125.18, 125.3, 125.15, 319
See application file for complete search history.

(56) References Cited

U.S. PATENT DOCUMENTS

| | | | |
|---|---|---|---|
| 5,022,141 A | 6/1991 | Nagata et al. | |
| 6,483,662 B1 | 11/2002 | Thomas et al. | |
| 6,980,396 B2 | 12/2005 | Kasajima et al. | |
| 7,310,202 B2 | 12/2007 | Kief et al. | |
| 7,443,632 B1 | 10/2008 | Stoev et al. | |
| 8,896,966 B2 | 11/2014 | Lee et al. | |
| 2003/0021191 A1* | 1/2003 | Hsu | G11B 5/127 369/13.17 |
| 2009/0002895 A1* | 1/2009 | Pust | G11B 5/02 360/319 |
| 2014/0269234 A1* | 9/2014 | Rivkin | G11B 5/3116 369/13.17 |
| 2014/0334041 A1* | 11/2014 | Hase | G01R 33/00 360/319 |

* cited by examiner

*Primary Examiner* — Allen T Cao
(74) *Attorney, Agent, or Firm* — Hall Estill Attorneys at Law

(57) ABSTRACT

A data writer may be configured with at least a write pole continuously extending from an air bearing surface to a via. The write pole can contact at least one yoke that contacts the write pole. The write pole and yoke may each be disposed between and separated from a write coil that has a single turn and continuously extends to opposite sides of the write pole.

20 Claims, 5 Drawing Sheets

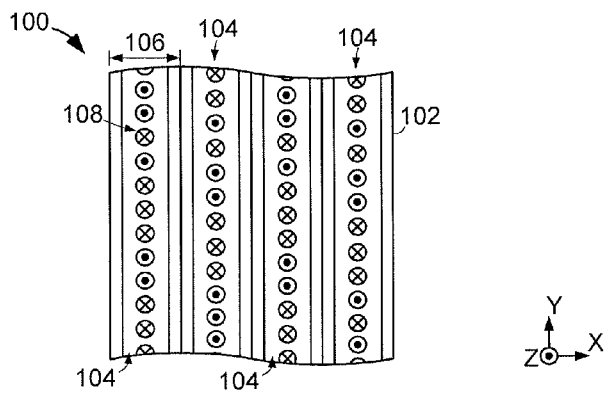
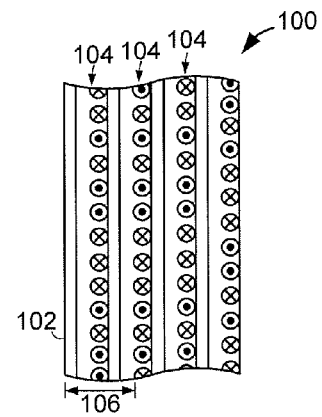
FIG. 1A                FIG. 1B
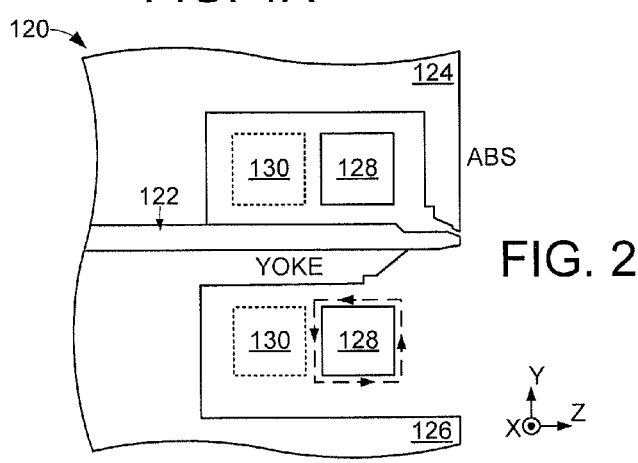
FIG. 2
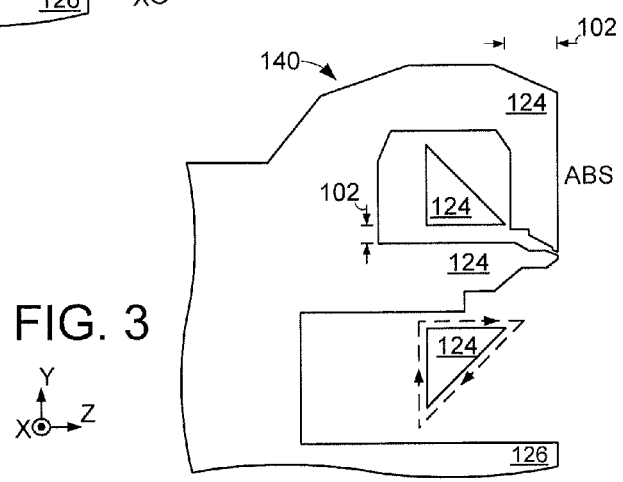
FIG. 3

DATA WRITER WITH SHAPED WRITE COIL

SUMMARY

A data writer, in accordance with assorted embodiments, has a write pole continuously extending from an air bearing surface to a via. The write pole is disposed between and separated from a write coil that has a single turn and continuously extends to opposite sides of the write pole.

BRIEF DESCRIPTION OF THE DRAWINGS

FIGS. 1A and 1B respectively show top view line representations of portions of an example data storage environments.

FIG. 2 conveys a cross-sectional line representation of a portion of an example data writer arranged in accordance with some embodiments.

FIG. 3 illustrates a cross-sectional line representation of a portion of an example data writer configured in accordance with various embodiments.

DETAILED DESCRIPTION

Figure 4A:
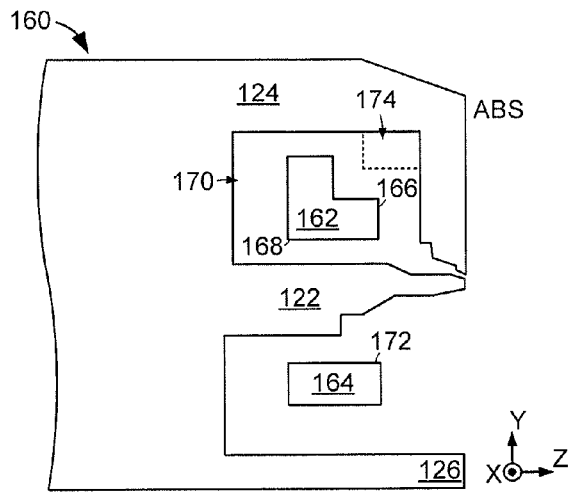
FIGS. 4A-4F respectively are cross-sectional line representation of portions of an example data writer arranged in accordance with assorted embodiments.

In an effort to provide greater data storage capacity, data bits are densely oriented on a data storage medium. Reduction in the physical size of a data writer allows the writing of individual data bits despite the bits being positioned in close proximity. However, a physically smaller data writer has less room for features that provide magnetic polarity switching, such as a high number of write coil turns, which reduces the magneto-motive force (MMF) in the data writer that allows data bits to be written.

To achieve a minimum MMF within small physical spaces that are available for coil turns, it is contemplated that write current can be increased. Although data writer rise time can be improved with increased write current, the risk of side track erasure (STE) conditions is also increased. With data storage progressing to greater data bit densities, an increased risk of STE can be particularly detrimental to the performance of a data storage device. Thus, there is a continued effort to decrease the size of a write coil while maintaining a minimal amount of MMF needed to write individual data bits in a high data bit density environment.

With these issues in mind, assorted embodiments shape the write coil of a data writer to provide a physically smaller write coil while maintaining at least a minimal amount of MMF needed to write individual data bits in a high data bit density environment without increasing the risk of STE. In accordance with some embodiments, a data writer is configured with a non-rectangular and non-circular write coil cross-sectional shape that allows the coil to be positioned closer to the air bearing surface (ABS), which provides better write pole rise time and better reliability. The ability to tune a write coil to provide multiple different shapes allows the writer's rise time to be balanced with the amount of magnetic flux leakage into air and adjacent magnetic shields.

As a non-limiting example of a data storage environment 100 with increased data density and reduced write coil space, FIGS. 1A and 1B respectively show top view line representations of a portion of a data storage medium 102. A plurality of data tracks 104 is displayed in FIG. 1A and illustrates how a reduction in data track pitch 106 brings the data bits 108 closer together. Such decrease in track pitch 106 also brings the data bits 108 of adjacent data tracks 104 closer together, which can make accurate data bit 108 sensing and writing difficult.

Smaller data track pitch 106 can also make a data storage environment 100 more susceptible to erasure conditions. For instance, accessing data bits 108 that are close to other adjacent on-track and off-track data bits 108 can require efficient supply and control of magnetic flux to allow different magnetic polarities to be successively written to individual bits 108. Although a strong write field can quickly write data bits 108 in an increased data density environment, such field strength can produce large erasure that inadvertently effect on-track and off-track data bits 108.

FIG. 1B illustrates how data tracks 104 can be shingled to partially overlap and increase the data storage capacity of the data storage environment 100. That is, despite having the same track pitch 106 as the data track 104 configuration of FIG. 1A, the tracks 104 of FIG. 1B are sequentially written to increase the overall number of data tracks 104 on a data storage medium 102. With less non-magnetic space between data bits 108 of adjacent data tracks 104, erasure conditions can more severely degrade performance and accuracy of a shingled data storage environment compared to the non-shingle data track 104 configuration of FIG. 1A.

Regardless of the configuration of the data tracks 104, closer proximity of data bits 108 within and between data tracks 104 emphasizes the ability of a data writer to quickly switch between magnetic polarities. Hence, a goal of assorted embodiments of a data writer is to shape a write coil to utilize minimal physical space around a write pole while providing ample field strength and rise time to accurately access individual data bits 108 without increasing the risk of erasure.

FIG. 2 is a cross-sectional line representation of a portion of an example data writer 120 configured in accordance with some embodiments. The data writer 120 has a write pole 122 disposed between first 124 and second 126 return poles. As shown, the first return pole 124 is also shaped to provide downtrack shielding of the write pole 122 on the ABS. The write pole 122 is disposed between a write coil 128 that may be constructed with a single turn, as displayed by solid lines, or as multiple continuous turns, as displayed by segmented lines 130. It is noted that each coil turn 130 has a uniform size and cross-sectional shape, but such arrangement is not limiting or required.

The rectangular cross-sectional shape of the coil 130 can distribute magnetic flux equally from each circumferential side 132, as illustrated by segmented arrows 134 which can saturate the return poles 124 and 126 and send flux towards the ABS in a manner that increases the risk of erasure conditions. Segmented arrows 134 illustrate how the rectangular shape of the write coil 128 produces a magnetic field that is relatively close to the ABS, in the case of the uptrack coil portion, and close to the first return pole 124, in the case of the downtrack coil portion.

With less coil turns 128 being utilized in high data density data writers, increased write current is supplied maintain at least a minimal MMF for the write pole 122. It can be appreciated that the coil's rectangular shape can operate in concert with increased write current to supply unwanted amounts of magnetization proximal to the ABS and first return pole 124, which can heighten the risk of STE and degrade the MMF produced by the write current. Hence, various embodiments configure at least one write coil turn 128 with a non-rectangular and non-circular shape that reduces the amount of magnetization proximal the ABS and first return pole 124 while providing ample magnetization proximal the write pole 122.

FIG. 3 displays a cross-sectional line representation of a portion of an example data writer 140 arranged with a non-rectangular and non-circular shaped write coil 142 in accordance with some embodiments. By configuring the coil 142 with a triangular cross-sectional shape, as shown, the magnetic field 144 is positioned closer to the write pole 122 than the ABS or first return pole 124. That is, the coil's triangular shape locates magnetic fields farther from the ABS and first return pole 124 than the rectangular coil 128 of FIG. 2 or a circular coil shape.

The reduction in magnetic field proximal the ABS and first return pole 124 provided by the triangular coil shape allows the coil 142 to be positioned closer to the write pole 122 and ABS without increasing the risk of STE and loss of magnetic flux to the first return pole 124. For example, the distance 146 from the write pole 122 to the write coil 142 along the Y axis and the distance 148 from the write coil 142 to the ABS along the Z axis can individually and collectively be decreased to optimize the translation of write current in the write coil 142 to MMF in the write pole 122 with better pole rise time and improved writer 140 reliability.

While the triangular cross-sectional shape of the write coil 142 can increase data writer performance despite having a single coil turn, the triangular shape is not limiting as other non-rectangular and non-circular shapes can be employed to provide ample MMF in the write pole 122 without increasing the risk of erasure conditions. FIGS. 4A-4F respectively show cross-sectional line representations of various write coil configurations as part of example data writers 160 in accordance with assorted embodiments. It is noted that any non-rectangular and non-circular coil shape may be utilized alone and in combination with rectangular and/or circular shaped coils.

FIG. 4A configures a first coil portion 162 with a substantial "L" shape while a second coil portion 164 has a rectangular shape. The L shape of the first coil portion 162 positions magnetic fields close to the write pole 122 without unduly saturating the first return pole 124 due to the length of the coil surface 166 facing the ABS being smaller than the write pole 122 facing coil surface 168.

With the second coil portion 164 having more non-magnetic space surrounding it compared to the first coil portion's position in a coil cavity 170 defined by the first return pole 124, the second coil portion 164 has a rectangular shape that is tuned so that a larger coil surface 172 faces the write pole 122 than faces the ABS. In some embodiments, the coil cavity 170 is configured with a non-rectangular shape that conforms to at least a portion of the first coil portion's shape. As shown by segmented section 174, the coil cavity 170 can match the shape of at least some of the first coil portion 162 by being parallel to at least one surface of the first coil portion 162, which can increase the size of the first return pole 124.

Figure 4B:
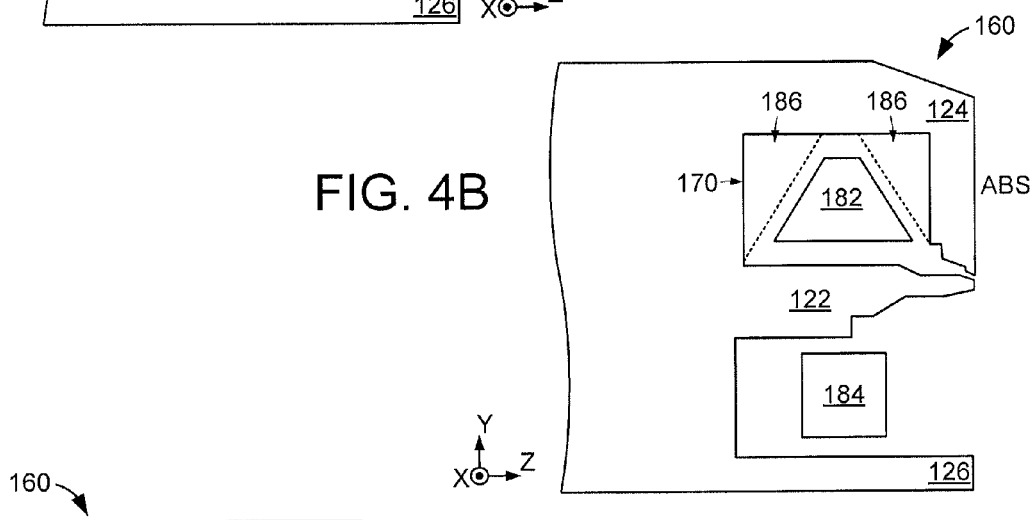

In FIG. 4B, a trapezoidal cross-sectional shape is utilized by the first coil portion 182 while a square shape is employed by the second coil portion 184. The trapezoidal first coil portion 182 shape presents a relatively large surface facing the write pole 122 and an ABS-facing surface that is angled away from the ABS to decrease the amount of magnetic absorption by the first return pole 124.

Segmented sections 186 of the coil cavity 170 in FIG. 4B illustrate how the trapezoidal first coil portion 182 shape can accommodate increased amounts of the first return pole 124. It is contemplated that the square second coil portion 184 can be sized and positioned to complement the trapezoidal first coil portion 182. For instance, the second coil portion 184 may have a greater area, be positioned farther from the write pole 122, or be positioned farther from the ABS than the first coil portion 182 to provide a balance between write current, MMF generated in the write pole 122, and risk of erasure conditions during operation.

Figure 4C:
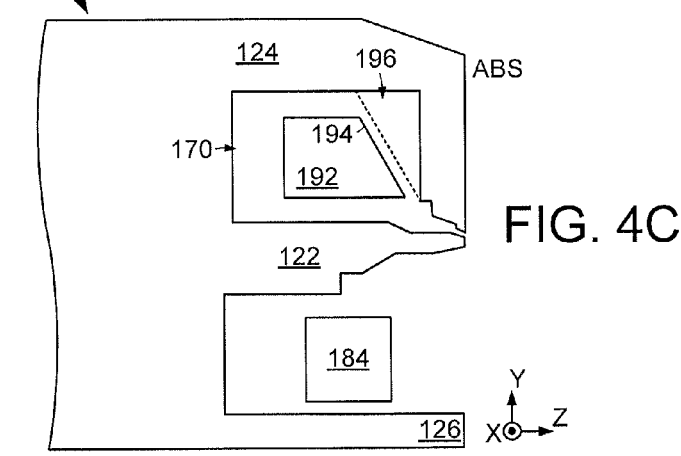

The data writer 160 of FIG. 4C displays how the square second coil portion 184 can be paired with a parallelogram first coil portion 192 that has a front surface 194 oriented at a non-zero angle with respect to the ABS and Y axis. The angle of the front surface 194 can be tuned to allow the first coil portion 192 to be physically closer to the ABS without unduly increasing the risk of magnetic saturation of the first return pole 124. The angled front surface 194 may further allow the first coil portion 192 to be physically larger than the square second coil portion 184 to increase write pole 122 rise time for a common write current density.

It is noted that the size, shape, and position of the first coil portion 192 in the coil cavity 170 is not limited to the arrangement of FIG. 4C. For example, the first coil portion 192 can be constructed to allow the coil cavity 170 to have a larger front portion 196, which can tune the magnetic performance of the data writer 160.

Figure 4D:
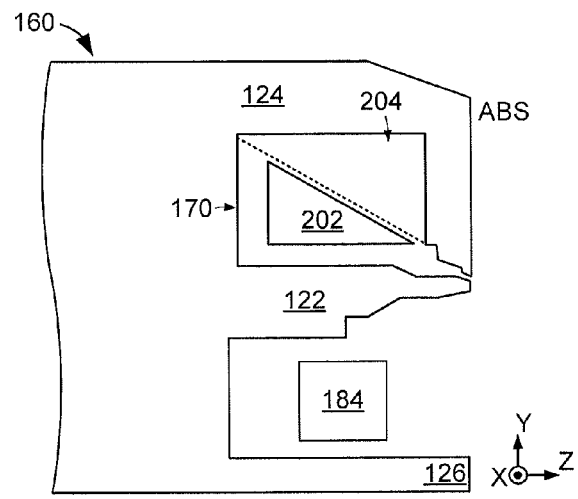

FIG. 4D displays an example data writer 160 configuration where a triangular first coil portion 202 employed with the square second coil portion 184. The ability to customize the first coil portion cross-sectional shape to be a variety of different configurations allows for a diverse variety of operational tuning. For instance, the pole facing coil surface of the first coil portion 202 can be customized to be longer than the pole facing coil surface of the second coil portion 184, which can correspond with a greater size and surface area for the first coil portion 202. The tuned size and position of the first coil portion 202 can be complemented by an increased front return pole 204 that tailors writer dynamics.

Figure 4E:
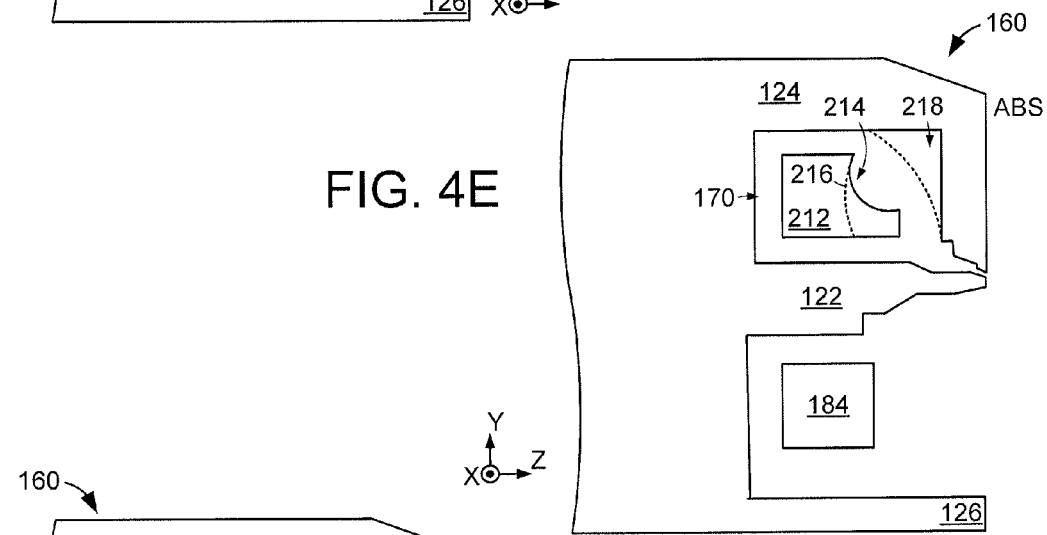
Figure 4F:
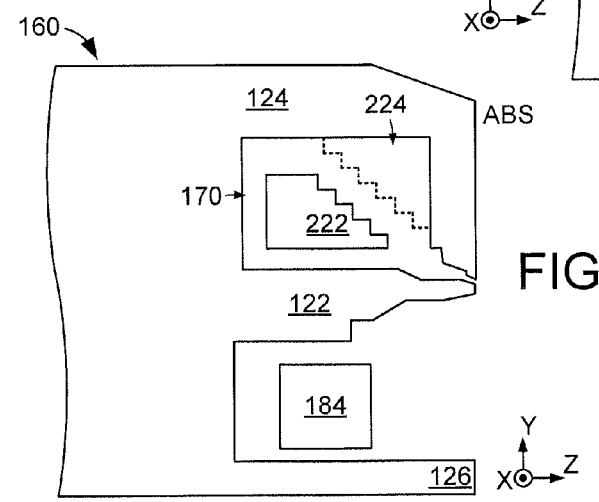

In accordance with some embodiments, a coil cross-sectional shape has at least one continuously curvilinear surface. FIG. 4E shows how a first coil portion 212 can be configured with a curvilinear surface 214 facing towards the ABS and first return pole 124. The curvilinear surface 214 can be arranged in a variety of manners, as illustrated by segmented surface 216, to customize the manner in which magnetic fields are translated from the coil to the write pole 122 in the coil cavity 170. It is noted that the first return pole 124 can independently or concurrently employ a curvilinear surface, as shown in segment 218.

While a continuously curvilinear surface in a coil is theoretically possible, there are practical challenges to creating a smooth curvilinear surfaces. Hence, various embodiments utilize a stepped arrangement, as illustrated by the first coil portion 222 of FIG. 4F. As shown, a series of perpendicular surfaces are connected in a stair-like fashion that decreases the risk of magnetic absorption by the first return pole 214. In a way, the cross-sectional shape of the first coil portion 222 acts as a hybrid of the triangular shape of portion 202 and the curvilinear shape of portion 212. While not required, the first return pole 124 may have a shaped segment 224 that matches the stepped configuration of the first coil portion.

It is expressly acknowledged that any of the coil cross-sectional shapes of FIGS. 4A-4F can be employed in a data writer alone and in combination. The position, size, and material of the coil are not limited to a particular configuration. As a non-limiting example, coil portions can be similar shapes oriented at different angles with respect to the write pole 122, oriented to be symmetrical about a longitudinal axis of the write pole 122 along the Z axis, or oriented to have a common orientation with respect to the write pole 122. Regardless of the configuration of the respective coil portions, the ability to customize the cross-sectional shape of the coil allows for optimized data writer 160 performance without occupying large amounts of space.

Figure 5A:
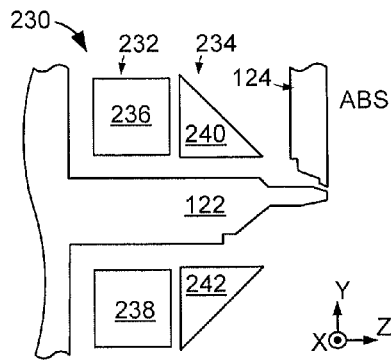
FIGS. 5A and 5B respectively depict cross-sectional line representations of portions of an example data writer in accordance with various embodiments.
Figure 5B:
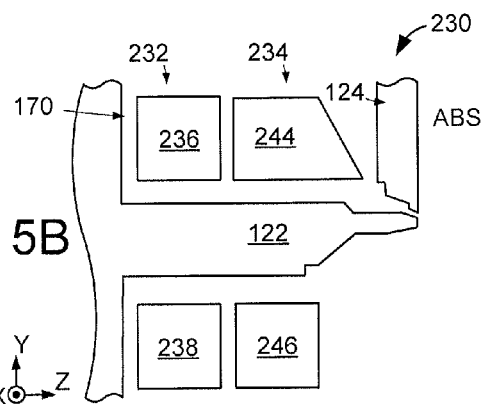

FIGS. 5A and 5B respectively display cross-sectional line representations of portions of an example data writer 230 that employs multiple write coil turns 232 and 234 that can respectively be shaped to tune the delivery of magnetic flux to the write pole 122 to optimize data writing performance. The first coil turn 232 has first 236 and second 238 portions while the second coil turn 234 has first 240 and second 242 portions. It is noted that each coil turn continuously extends to opposite sides of the write pole 122 and from the first coil turn 232 to the second coil turn 234.

As shown in FIG. 5A, the first 236 and second 238 portions of the first coil turn 232 have a common shape and distance from the ABS. The first 240 and second 242 portions of the second coil turn 234 each have a triangular shape and are arranged symmetrically about the write pole 122 along the Z axis. The symmetric configuration of the second coil turn 234 allows the hypotenuse surface of the triangular shape to taper away from the ABS and first return pole 124, which can decrease the saturation of the first return pole 124 during operation.

The data writer 230 of FIG. 5B illustrates how the second coil turn 234 can be configured with different shapes for the first 244 and second 246 coil portions. The presence of the first coil portions 236 and 244 in the coil cavity 170 can correspond with the first coil portion 244 having a parallelogram cross-sectional shape that tapers away from the first return pole 124 and the ABS. With the increased non-magnetic space between the write pole 122 and the second return pole 126, the second coil portion 246 of the second coil turn 234 can have a square, or rectangular, shape without concern for magnetic fields saturating the second return pole 126 or increasing the risk of erasure during operation.

Figure 6A:
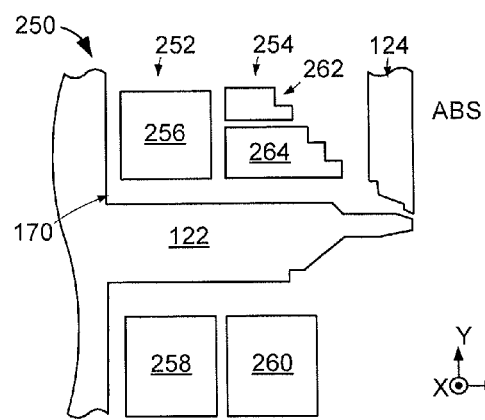
FIGS. 6A and 6B respectively display cross-sectional line representations of portions of an example data writer configured in accordance with some embodiments.
Figure 6B:
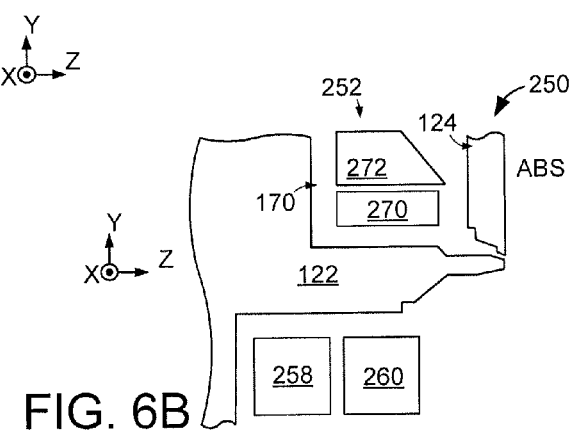

FIGS. 6A and 6B respectively show cross-sectional line representations of portions of an example data writer 250 configured in accordance with various embodiments. First 252 and second 254 coil turns continuously wrap around the write pole 122 with the first 256 and second 258 coil portions of the first coil turn 252 as well as the second coil portion 260 of the second coil turn 254 each having a rectangular cross-sectional shape, such as having square dimensions.

The coil cavity 170 in FIG. 6A is occupied by the first coil portion 256 of the first coil turn 252 along with first 262 and third 264 coil portions of the second coil turn 254. Although the first 262 and third 264 coil portions of the second coil turn 254 are separated by non-magnetic material, the coil portions can collectively provide similar or dissimilar cross-sectional shapes that control how magnetization transfers from the write coil to the write pole 122 and first return pole 124. It is noted that the first 262 and third 264 coil portions can be different sizes, as shown, and different positions relative to the ABS to provide ample magnetic flux to the write pole 122 without saturating the first return pole 122.

However, the lateral position of the first coil portions of the first 252 and second 254 coil turns may be altered to control the data writing performance of the data writer 250. FIG. 6B illustrates how coil portions of different coil turns can be vertically stacked, but separated in the coil cavity 170. That is, the first coil turn 252 can consist of the second coil portion 258 on a first side of the write pole 122 and the first coil portion 270 in the coil cavity 170. The second coil turn 254 can consist of the second coil portion 260 and the parallelogram shaped first coil portion 272.

The vertically stacked coil portion arrangement in the coil cavity 170 can be complemented by moving the second coil portions 258 and 260 farther away from the ABS. In other words, the vertical orientation of the coil portions 270 and 272 in the coil cavity 170 may provide ample MMF in the write pole 122 with the second coil portions 258 and 260 moved away from the ABS, which decreases the risk of erasure and flux leakage from the second coil portions 258 and 260.

It is noted that the orientation and shapes of the various coil portions in FIGS. 5A, 5B, 6A, and 6B are not limiting or required. As such, non-rectangular and non-circular shaped coil portions can be utilized alone or in combination with one or more rectangular or circular shaped coil portions on either side of the write pole 122. The ability to tune one or more coil turns with different coil portions having rectangular or non-rectangular cross-sectional shapes serves to cater the operation of a data writer with respect to the generation of MMF in the write pole, such as with better rise time, and the reduction in field strength on the ABS, such as with better reliability.

Figure 7:
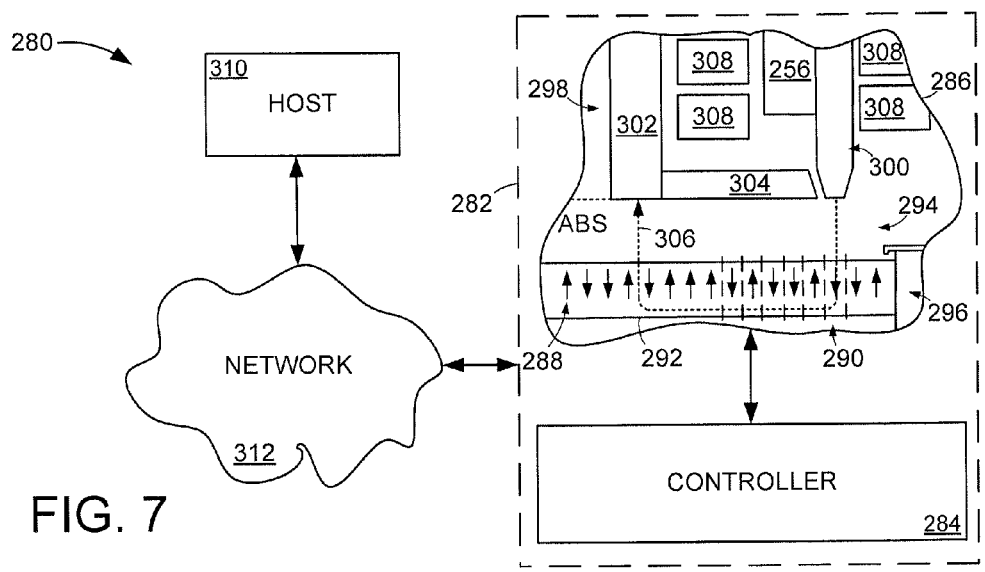
FIG. 7 displays a line representation of an example data storage system capable of employing a data writer in accordance with assorted embodiments.

FIG. 7 generally displays an example data storage system 280 that is arranged in accordance with some embodiments. Although not required or limiting, the data storage system 280 may have any number of data storage devices 282 that comprise one or more local controllers 284 and a data transducing assembly 286. The transducing assembly 286 can access one or more magnetic data bits 288 that are perpendicularly stored in and read from data tracks 290 on a data storage medium 292.

The transducing assembly 286 has a head that flies on an air bearing 294 produced by rotation of the data storage medium 292, as controlled by a centrally positioned spindle motor 296. In this way, the local controller 284 can dictate data access to and from the data medium 292 across the air bearing 294 by spinning the spindle motor 296 and activating the data writer 298. The data writer 298 can be formed with a write (main) pole 300 and a return pole 302 that are separated by a trailing shield 304 and create a writing circuit 306 to impart a desired magnetic orientation to the adjacent storage medium 292.

The data writer 298 further consists of a write coil 308 that can be one or many individual wires capable of imparting a magnetic flux on the write pole 300 that forms the writing circuit 306. The writing circuit 306 can be a magnetic path passing from the write pole 300 through a soft underlayer of the the storage medium 292 to the trailing shield 304 and return pole 302 to a magnetic via and back to the write pole 300

While the data storage device 282 can operate alone, it is contemplated that one or more remote hosts 310, such as a server, node, or processor, can access and control the data storage device 282 via a wired or wireless network 312. The ability to connect any type, function, and number of computing components to the data storage device 282 remotely allows for customized utilization of the data storage device 282. Despite the ability to remotely and locally control the transducing head 286, increased data bit 288 density and reduced data track 290 width, as measured along the X axis, can stress the magnetic extent and precision of at least the data writer 298.

Figure 8:
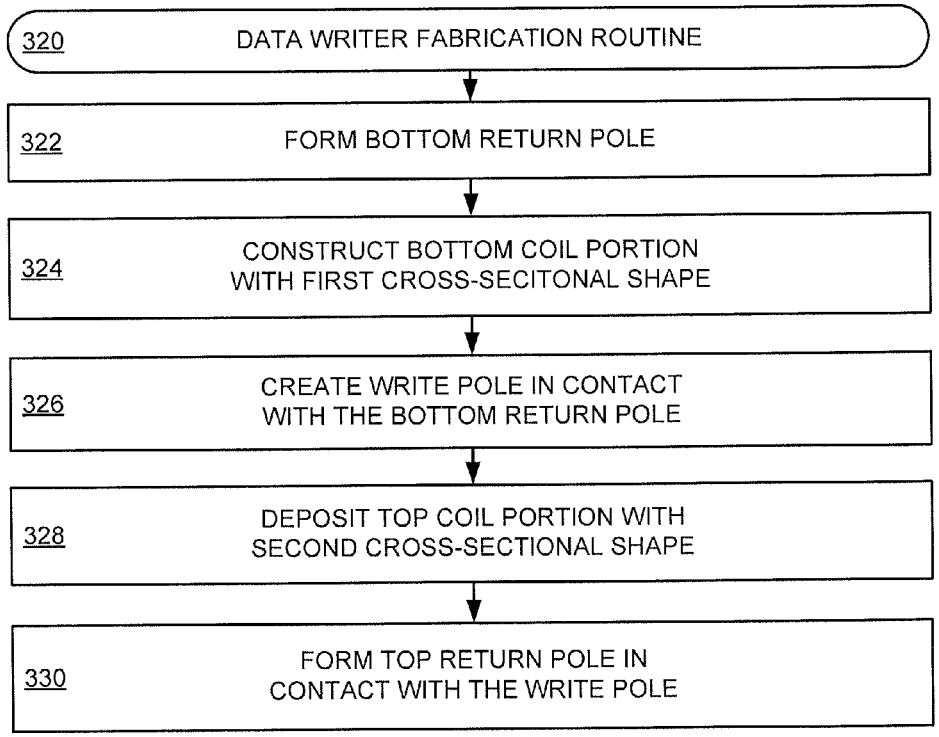
FIG. 8 provides a flowchart of a data writer fabrication routine carried out in accordance with various embodiments.

FIG. 8 is a flowchart of an example data writer fabrication routine 320 that can be carried out in accordance with assorted embodiments to produce a tuned single coil turn data writer. Initially, step 322 forms a bottom return pole, which can correlate to the second return pole of FIGS. 2-6B. The bottom return pole may physically and magnetically connect with a via portion of a write pole, distal the ABS. Step 324 proceeds to construct a portion of a write coil with a first cross-sectional shape, such as rectangular, parallelogram, or triangular. The bottom portion of the write coil can be tuned in step 324 to have any shape, length, recess distance from an ABS, and number of coil turns of similar or dissimilar cross-section shapes to optimize MMF generation in a write pole during operation.

It is contemplated that a portion of a write coil is formed prior to step 324, but such step is not required or limiting. The write pole may be created in step 326 in any number of processes that provide multiple different regions having uniform or varying widths configured to optimize flux delivery to the ABS. Next, step 328 forms another portion of a write coil having a second cross-sectional shape while being in contact with the write coil deposited in step 324. That is, a data writer at the conclusion of step 328 can have a single write coil that has coil portions with different, or common, cross-sectional shapes extending to opposite sides of the write pole.

As illustrated in the various embodiments of FIGS. 2-6B, the write coil formed in steps 324 and 328 can have one or more turns and cross-sectional shapes that are configured to provide an optimized balance of delivery of magnetic flux to the write pole with reduced magnetic leakage towards the ABS. Accordingly, steps 324 and 328 can collectively form a write coil with at least one non-rectangular and non-circular cross-sectional shape to direct magnetic flux towards the write pole instead of towards the ABS.

Routine 320 then forms a top return pole in physical and magnetic contact with the write pole in step 330. The top return pole may correspond with the first return pole 124 of FIGS. 2-6B that defines a coil cavity 170. It is contemplated that step 330 shapes a portion of the top return pole to match a portion of the coil positioned in the coil cavity. For instance, step 330 can construct the coil cavity to have a non-rectangular shape with at least one surface angled with respect to the ABS to be parallel with a surface of the write coil.

Although the steps of routine 320 can optimize the structure and performance of a data writer, the various steps are not required or limiting. Hence, any steps can be altered or removed and any number of decisions and steps can be added. As a non-limiting example, one or more decisions may be incorporated into routine 320 to evaluate the number of coil turns and/or the number of separate coil portions in the coil cavity.

It is noted that the ability to shape at least a portion of a write coil with a non-rectangular and non-circular cross-sectional shape reduces the write current required to produce ample MMF in a write pole to operate in high data density environments. The tuned coil shape allows the coil portions to be physically closer to the ABS and write pole, with can improve pole rise time while reducing field strength on the ABS, which decreases risk of erasure conditions. The shaped write coil further allows less coil turns to be employed, which decreases the physical footprint of the write coil without degrading the generation of MMF in the write pole.

It should be noted while the embodiments have been directed to magnetic writing, the claimed embodiments can readily be utilized in any number of other applications, including data reading applications. Furthermore, it is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed.

What is claimed is:

1. An apparatus comprising a write pole continuously extending from an air bearing surface (ABS) to a via, the write pole having a write pole tip with a first width on the ABS, a first tapered portion extending from the write pole tip with a first varying width, and a second tapered portion extending from the first tapered portion with a second varying width, the second tapered portion aligned with the write coil, the write pole disposed between a single turn of a write coil, the write pole separated from the single turn, the write coil having only the single turn and continuously extending to opposite sides of the write pole.

2. The apparatus of claim 1, wherein the write coil has a helical shape.

3. The apparatus of claim 1, wherein the write coil has a cross-sectional aspect ratio with a greater height than width, the height measured parallel to the ABS and the width measured perpendicular to the ABS.

4. The apparatus of claim 1, wherein the write coil has a cross-sectional aspect ratio with a greater width than height, the height measured parallel to the ABS and the width measured perpendicular to the ABS.

5. The apparatus of claim 1, wherein the write pole has a non-uniform width from the ABS to the via.

6. An apparatus comprising a write pole continuously extending from an air bearing surface (ABS) to a via, the write pole contacting top and bottom yokes respectively positioned on opposite sides of the write pole, the write pole and yokes disposed between and separated from a write coil having a single turn and continuously extending to opposite sides of the write pole.

7. The apparatus of claim 6, wherein the top and bottom yokes each continuously extend from the via.

8. The apparatus of claim 6, wherein the top and bottom yokes have a lower magnetic moment than the write pole.

9. The apparatus of claim 6, wherein the write coil is separated from each yoke by 200 nm or less.

10. The apparatus of claim 6, wherein each yoke has a core length of 2.5 micrometers or less, the core length measured from a front edge of each yoke to the via perpendicular to the ABS.

11. The apparatus of claim 6, wherein the write pole tapers from each yoke to a write pole tip.

12. The apparatus of claim 6, wherein a front edge of each yoke is aligned with a front edge of the write coil.

13. The apparatus of claim 12, wherein the front edges of the yokes and write coil are separated from the ABS by 0.7-1.1 micrometers.

14. An apparatus comprising a write pole continuously extending from an air bearing surface (ABS) to a via, a top return pole continuously extending from the ABS proximal the write pole to the via, the write pole disposed between and separated from a write coil positioned between the top return pole and write pole, the write coil having a single turn and continuously extending to opposite sides of the write pole.

15. The apparatus of claim 14, wherein the write pole is disposed between top and bottom return poles on the ABS.

16. The apparatus of claim 15, wherein the top return pole has a different shape than the bottom return pole.

17. The apparatus of claim 14, wherein a write pole paddle portion of the top return pole comprises first, second, and third tapered portions each with varying lengths as measured perpendicular to the ABS.

18. The apparatus of claim 17, wherein the respective tapered portions decrease towards the write pole.

19. The apparatus of claim 17, wherein the third tapered portion has an angled surface parallel to a tapered surface of the write pole.

20. The apparatus of claim 14, wherein the top return pole has a greater height on the ABS than the write pole.

\* \* \* \* \*